(No Model.) 3 Sheets—Sheet 2.
A. M. HEWLETT & W. B. SANDFORD.
APPARATUS FOR PREPARING STRIPS OF IRON, STEEL, &c.
No. 537,461. Patented Apr. 16, 1895.
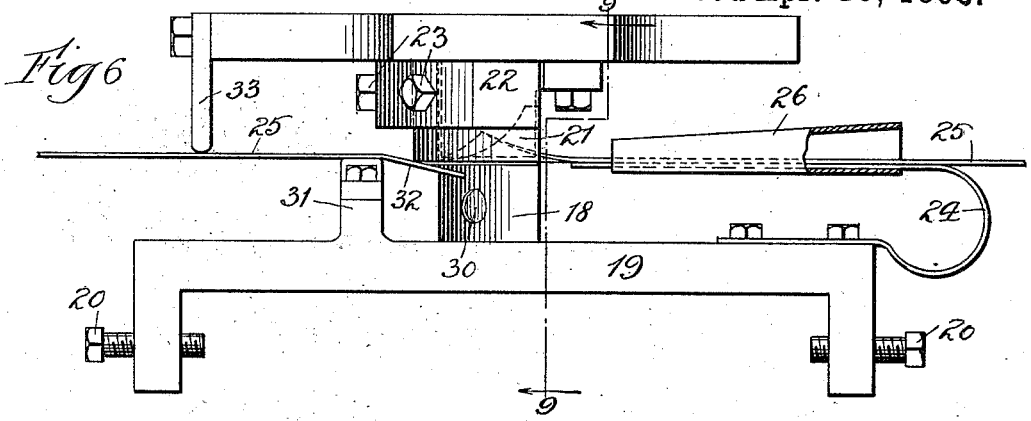
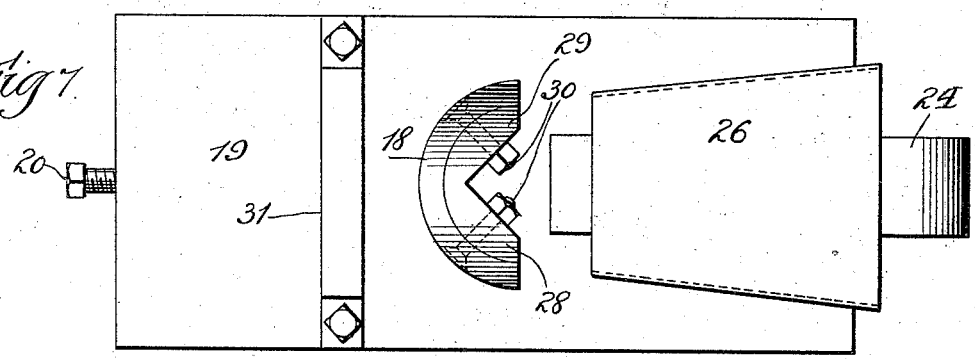
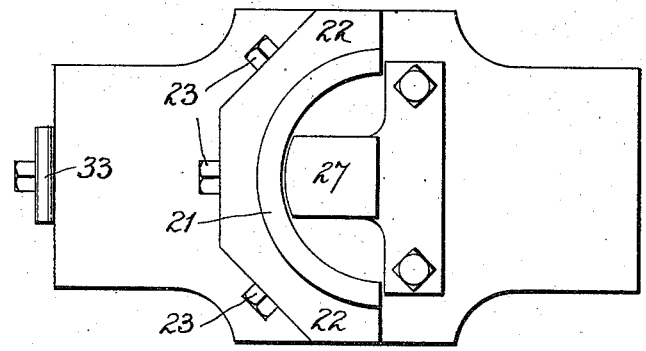
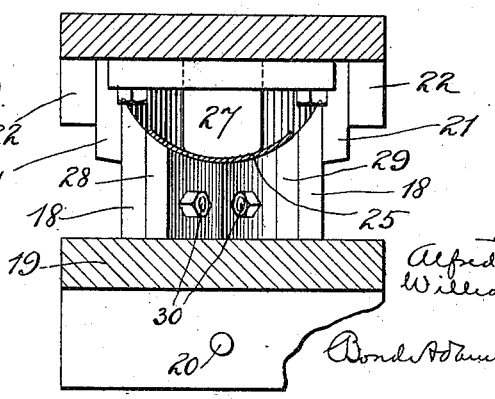
Witnesses
Wm. F. Hanning
Julia M. Bristol
Inventors
Alfred M. Hewlett
William B. Sandford
by
Bond Adams Pickard & Jackson
Attys.

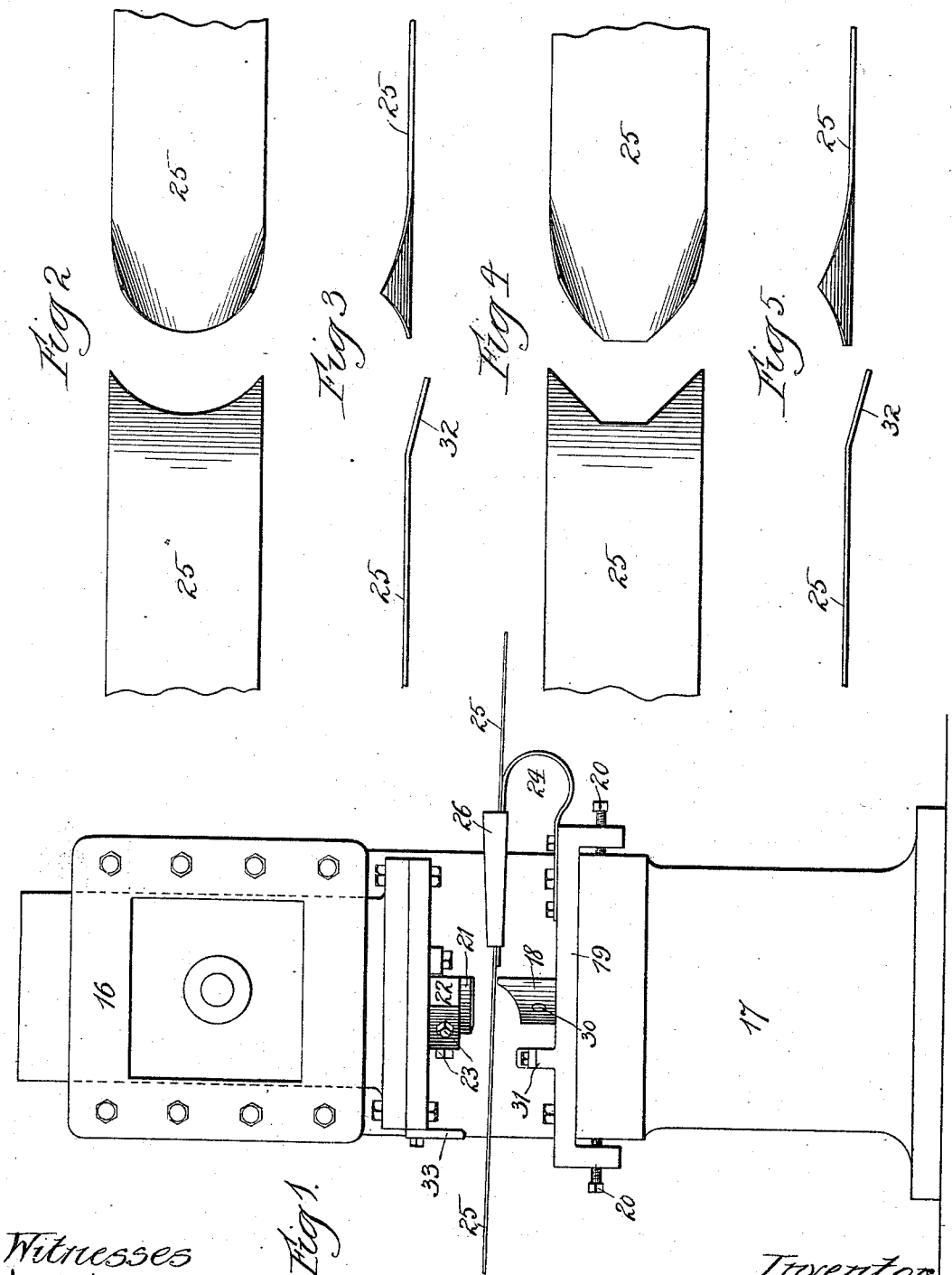

(No Model.) 3 Sheets—Sheet 3.
A. M. HEWLETT & W. B. SANDFORD.
APPARATUS FOR PREPARING STRIPS OF IRON, STEEL, &c.
No. 537,461. Patented Apr. 16, 1895.
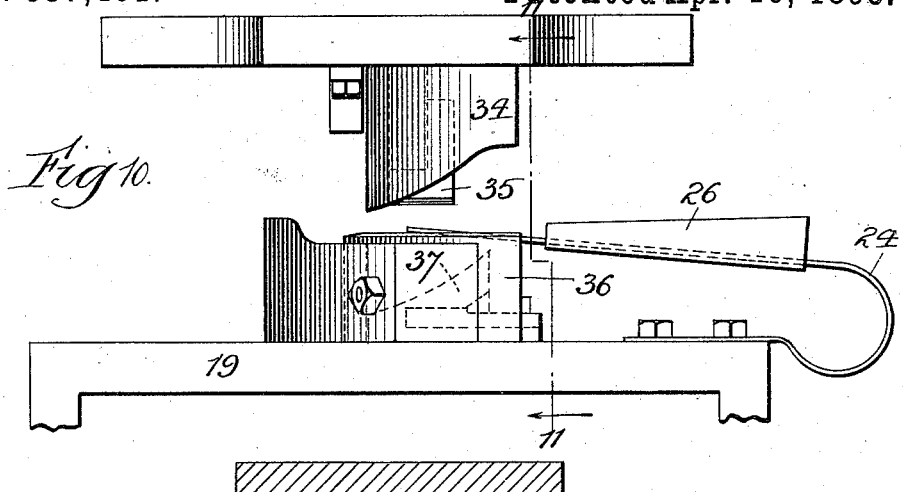
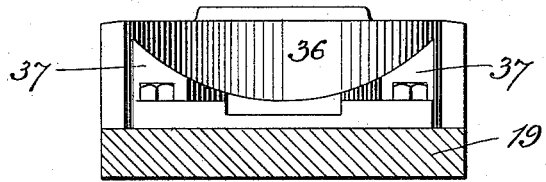
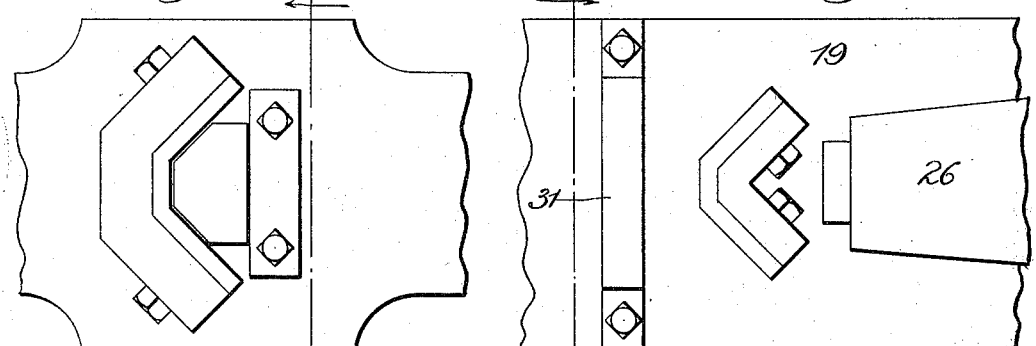
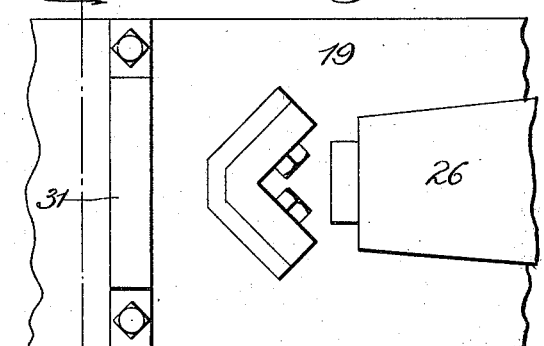
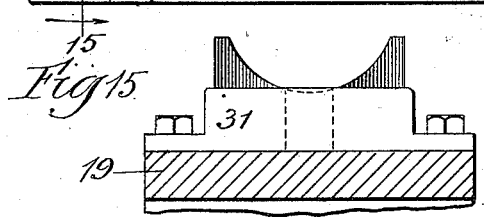

UNITED STATES PATENT OFFICE.

ALFRED M. HEWLETT AND WILLIAM B. SANDFORD, OF KEWANEE, ILLINOIS.

APPARATUS FOR PREPARING STRIPS OF IRON, STEEL, &c.

SPECIFICATION forming part of Letters Patent No. 537,461, dated April 16, 1895.

Application filed April 24, 1894. Serial No. 508,897. (No model.)

*To all whom it may concern:*

Be it known that we, ALFRED M. HEWLETT and WILLIAM B. SANDFORD, citizens of the United States, residing at Kewanee, in the county of Henry and State of Illinois, have invented a certain new and useful Improvement in Apparatus for Preparing Strips of Iron or Steel to be Used in the Manufacture of Butt-Weld Pipe, of which the following is a specification, reference being had to the accompanying drawings, in which—

Figure 1 is a side elevation of one form of our improved apparatus. Fig. 2 is a plan view, showing the opposite ends of strips after they have been shaped. Fig. 3 is a side elevation of the same. Fig. 4 is a plan view, showing a modified form. Fig. 5 is a side view of the strips shown in Fig. 4. Fig. 6 is an enlarged detail, being a side view of the cutting knives. Fig. 7 is a plan view of the lower knife. Fig. 8 is an under side view of the upper knife. Fig. 9 is a section on line 9—9 of Fig. 6. Fig. 10 is an enlarged detail, being a side view showing a modified form of apparatus. Fig. 11 is a section on line 11—11 of Fig. 10. Fig. 12 is an under side view of a knife similar to that shown in Fig. 10 except that it is arranged to cut the end of the strip into angular instead of rounded form. Fig. 13 is a section on line 13—13 of Fig. 12. Fig. 14 is a plan view of a lower knife corresponding to the knife shown in Fig. 12; and Fig. 15 is a section on line 15—15 of Fig. 14.

In the manufacture of butt-weld pipe as commonly practiced, the strips, commonly called skelps, are prepared to be drawn through the welding bells by taking a strip of iron or steel as it is rolled, and cutting it by a square cut with ordinary shears into skelps of lengths suitable for making pipe. The ends of the skelps are then beveled by clipping off the corners by a suitable shear. A tag is then welded to one end of the strip, either by a steam or a hand hammer. For the purpose of welding the tag to the skelp both the end of the tag and the end of the skelp are heated to a welding heat, after which the end of the skelp is placed upon a swage or die that is cupped out, the tag being then welded to the skelp by hammering. The end of the skelp is thereby bent down into the die and shaped so that it will adapt itself more readily to circular form as the skelp is drawn through the welding bell. After the tag has been welded to the skelp, the skelp is placed in the furnace to be heated preparatory to its being drawn through the bell. In most pipe mills it is customary to charge the skelp into the furnace back end first so that the tag will project through the furnace door, and in order to prevent the rear end of the skelp from raking up the bed of the furnace it is turned up just before the skelp is put into the furnace by a boy who stands at the furnace door.

The objects of our invention are to avoid the objections incident to the method of operation above set forth, and to provide an improved method of treatment whereby the skelps may be quickly and economically prepared.

A further object of our invention is to provide improved apparatus for preparing the skelps.

To this end our improved method consists in cutting the strips as they come from the rolling mills into skelps of the proper length, the shape of the cut being such as to bevel or curve one end of the strip, and to simultaneously shape the ends of the severed strips into proper form, one end being bent to the shape required for the rear end of the skelp, the opposite end of the strip being bent into a more or less rounded form to adapt it to enter the welding bell. The shape of the opposite ends of two skelps is illustrated in Figs. 2 to 5, Figs. 2 and 3 showing skelps having rounded ends, and Figs. 4 and 5 showing them with beveled ends. The skelps are in the position which they occupy after being passed through the shearing and forming machine, but before placing them in the furnace they are turned over, bringing the seam of the pipe on the under side as the skelp is drawn through the welding bell.

Referring to the drawings:—16 indicates a shearing machine, of which 17 is the base.

18 indicates a lower knife, which is supported upon a plate 19 which is secured to the base 17 by set screws 20, as shown in Fig. 1. As best shown in Fig. 7, the knife 18 is semicircular in form, and it is also concave, as shown in Fig. 1, the cutting edge being on the outer edge of the blade.

21 indicates an upper knife, which is also semicircular in form, its cutting edge being innermost and being of practically the same degree of curvature as that of the cutting edge of the lower knife 18. The cutting edge of the upper knife 21 is in a horizontal plane, or substantially so. As shown in Fig. 1, the upper knife 21 is secured to a suitable block or support 22 by set screws 23, so that the knife may be removed when necessary. Suitable mechanism, not shown, is provided for reciprocating the block 22 and knife 21, the arrangement being such that the knife 21 may be moved down to the lowermost portion of the cutting edge of the knife 18, as shown in Fig. 6.

24 indicates a spring support which is secured upon the plate 19, and extends toward the knife 18 in a suitable position to support the strip 25 which is to be cut and shaped. The spring 24 carries a guide 26 through which the strip 25 passes.

The strip being passed through the guide 26, it will be supported by the spring 24 and the upper portions of the knife 18. When the upper knife 21 is moved down over the lower knife the strip will be at first cut only at its edges, as the lower knife supports it at such points only. As the upper knife continues to descend, however, the strip will be pressed downward into contact with the cutting edge of the lower knife, and will be gradually cut from the edges toward the center until, when the upper knife reaches the lowermost portion of the cutting edge of the lower knife, the strip will have been cut completely across, but it will also have been shaped to conform to the shape of the cutting edge of the lower knife. In order, however, to more positively shape the strip, the upper knife 21 is provided with an internal block or frog 27, the lower surface of which is substantially upon a level with the cutting edge of the upper knife, as shown in Figs. 8 and 9, so that as the upper knife descends the frog 27 will come into contact with the strip and will bend it down into the proper shape. As shown in Fig. 9, the lower knife 18 is provided with internal blocks or supports 28—29, which support the end of the strip after it is bent down as above described. The blocks 28 also serve as supports to which the lower knife blade is secured by bolts 30, as shown in Fig. 9.

In order to simultaneously bend down the end of the strip opposite to that which is pressed into rounded form to adapt it to more readily enter the furnace, the upper knife 21 is made broad, as shown in Figs. 1, 6 and 8, and a block 31 is provided in a suitable position to support the severed end of the strip, as best shown in Fig. 6. The height of the block 31 is such that when the upper knife 21 descends to its lowermost position the outer edge of such knife will strike the severed end of the strip 25, and will bend it down slightly, as best shown in Fig. 6, the body of the strip 25 being supported upon the block 31. By this means a turned down portion 32 is formed. A depending arm 33 is also provided, to prevent the outer end of the severed strip from flying up, as shown in Fig. 6. It will be seen that by this means the strip as it comes from the rolling mill is severed into pipe lengths, one end of the strip being bent down to adapt it to enter the furnace promptly, and the opposite end of the strip being bent into curved form, and being also rounded so that it will be adapted to enter the welding bell more readily and adapt itself to rounded form.

Instead of using knives which are semicircular in form, as above described, the knives may be shaped so as to clip off the corners of the severed strips. In Figs. 12 to 15 knives adapted to cut the strips in such shape are illustrated. Such knives differ in no way from those shown in Figs. 1 to 9 inclusive except that they are adapted to cut beveled strips instead of rounded ones.

Instead of making the cutting edge of the lower knife concave and the cutting edge of the upper knife plane, the upper knife may have a convex edge and the edge of the lower knife may be plane. In the latter case, the upper knife 34 is provided with a lock or frog 35, and the lower knife 36 is provided with an internal die or block 37 which is concave. The upper knife is adapted to fit into the lower knife, so that when the upper knife descends the strip will be sheared, the frog 35 and inner portion of the knife 34 pressing the severed end of the strip down upon the die 37, thereby pressing it into the proper shape.

We wish it to be understood that the cutting edges of the knives may be of any form such as would adapt them for cutting metal.

Although we prefer to make the cutting edges curved as illustrated, as the strip is thereby bent into the best shape for the purpose and the operation of cutting is made smoother, yet, if desired, the cutting edges may be made polygonal, provided the faces are so arranged as to properly bend the strip; and the term curved as herein used is intended to embrace all such modifications.

That which we claim as our invention, and desire to secure by Letters Patent, is—

1. In a combined shearing and forming machine, the combination of a pair of co-acting knives, one of said knives having a cutting edge, the parts of which are in the same plane, and the other a cutting edge curved relative to such plane, whereby one of the severed ends of the strip will be bent into rounded shape simultaneously with the operation of cutting, substantially as described.

2. A combined shearing and forming machine having a pair of cutting blades, one of said blades being curved, whereby as the blades are brought together one of the severed ends of the strip will be bent into rounded shape simultaneously with the operation of cutting, and means for bending the other of the severed ends to an angle with the body of the strip, substantially as and for the purpose specified.

3. In a combined shearing and forming machine, the combination with a vertically reciprocating upper knife, of a lower knife adapted to co-act with said upper knife to sever a strip, one of said knives having a cutting edge, the parts of which are in the same plane, and the other a cutting edge curved relative to such plane, whereby one of the severed ends of the strip will be bent into rounded shape simultaneously with the operation of cutting, substantially as described.

4. In a combined shearing and forming machine, the combination with a vertically reciprocating upper knife, of a lower knife adapted to co-act with said upper knife to sever a strip, one of said knives having a cutting edge, the parts of which are in the same plane, and the other a cutting edge curved relative to such plane, whereby one of the severed ends of the strip will be bent into rounded shape simultaneously with the operation of the cutting, and a spring support for the strip, substantially as described.

5. In a combined shearing and forming machine, the combination with a vertically reciprocating upper knife, of a lower knife adapted to coact with said upper knife to sever a strip, one of said knives being curved whereby one of the severed ends of the strip will be bent into rounded shape simultaneously with the operation of cutting, a spring support for the strip, and a guide carried by said spring support, and through which guide the strip passes, substantially as described.

6. In a combined shearing and forming machine, the combination with a vertically reciprocating upper knife, of a lower knife adapted to coact with said upper knife to sever a strip, one of said knives being curved whereby one of the severed ends of the strip will be bent into rounded shape simultaneously with the operation of cutting, and means for bending the other of the severed ends to an angle with the strip, substantially as described.

7. In a combined shearing and forming machine, the combination with a lower concave knife, of an upper plane knife adapted to be reciprocated toward and from said lower knife, substantially as described.

8. In a combined shearing and forming machine, the combination with a lower concave knife, of an upper plane knife adapted to be reciprocated toward and from said lower knife, and an internal block or frog 27 moving with said upper knife, substantially as described.

9. In a combined shearing and forming machine, the combination with upper and lower knives, one of said knives being curved whereby as the blades are brought together the strip will be bent into more or less rounded form simultaneously with the operation of cutting, of a block or frog carried by one of said knives, substantially as and for the purpose specified.

10. In a combined shearing and forming machine, the combination with a pair of cutting blades, one of said blades being curved, whereby as the blades are brought together the strip will be bent into more or less rounded form simultaneously with the operation of cutting, of a support for the severed portion of the strip, and means for pressing down the end of such severed portion whereby such end will be bent to an angle with the body of the strip, substantially as and for the purpose specified.

11. A combined shearing and shaping machine having means for shearing or severing a strip, means for shaping one of the severed ends into curved form whereby it will adapt itself more readily to rounded form when entering the welding bell, and means for bending the other of the severed ends to an angle with the body of the strip, substantially as described.

ALFRED M. HEWLETT.
WILLIAM B. SANDFORD.

Witnesses:
WILLIAM ZANY,
KATIE MURCHISON.